United States Patent
Godbout et al.

(10) Patent No.: US 9,753,222 B2
(45) Date of Patent: Sep. 5, 2017

(54) ASYMMETRIC OPTICAL FIBER COUPLER

(71) Applicant: POLYVALOR, LIMITED PARTNERSHIP, Montreal (CA)

(72) Inventors: Nicolas Godbout, Verdun (CA); Caroline Boudoux, Montreal (CA); Wendy-Julie Madore, Montreal (CA); Simon Lemire-Renaud, Montreal (CA); Xavier Daxhelet, Montreal (CA); Mikael Leduc, Laval (CA)

(73) Assignee: POLYVALOR, LIMITED PARTNERSHIP, Montreal (CA)

( * ) Notice: Subject to any disclaimer, the term of this patent is extended or adjusted under 35 U.S.C. 154(b) by 0 days.

(21) Appl. No.: 14/765,021

(22) PCT Filed: Jan. 31, 2014

(86) PCT No.: PCT/CA2014/050065
§ 371 (c)(1),
(2) Date: Jul. 31, 2015

(87) PCT Pub. No.: WO2014/117277
PCT Pub. Date: Aug. 7, 2014

(65) Prior Publication Data
US 2015/0378105 A1 Dec. 31, 2015

Related U.S. Application Data

(60) Provisional application No. 61/759,482, filed on Feb. 1, 2013.

(51) Int. Cl.
*G02B 6/255* (2006.01)
*G02B 6/28* (2006.01)
(Continued)

(52) U.S. Cl.
CPC .......... *G02B 6/2835* (2013.01); *G02B 6/245* (2013.01); *G02B 6/2856* (2013.01)

(58) Field of Classification Search
CPC ..... G02B 6/245; G02B 6/2835; G02B 6/2856
See application file for complete search history.

(56) References Cited

U.S. PATENT DOCUMENTS 4,586,784 A * 5/1986 Tremblay ............. G02B 6/2856
264/1.25
4,828,350 A * 5/1989 Kim ........................ G02B 6/14
385/28

(Continued)

FOREIGN PATENT DOCUMENTS

WO    WO88/09943       12/1988
WO    WO 9834138 A2 *  8/1998  ........... G02B 6/2835

(Continued)

OTHER PUBLICATIONS

Lorenser et al., "Dual-modality needle probe for combined fluorescence imaging and three-dimensional optical coherence tomography", Optic Letters, vol. 38, No. 3, Feb. 1, 2013.

(Continued)

*Primary Examiner* — Rhonda Peace
(74) *Attorney, Agent, or Firm* — Norton Rose Fulbright Canada LLP

(57) ABSTRACT

There is described an optical fiber coupler in which at least one fiber is a multiple-clad fiber, containing a single-mode core supporting a single guiding mode and an inner multi-mode cladding guiding multiple modes. The multiple-clad fiber is fused with a second fiber of a different etendue to create an optical fiber coupler having an enhanced multi-mode signal transmission.

24 Claims, 16 Drawing Sheets

(51) Int. Cl.
*G02B 6/245* (2006.01)
*G02B 6/24* (2006.01)

(56) References Cited

U.S. PATENT DOCUMENTS

| | | | | |
|---|---|---|---|---|
| 5,004,316 | A * | 4/1991 | Hill | G02B 6/283 |
| | | | | 385/43 |
| 5,015,058 | A * | 5/1991 | Thorncraft | G02B 6/2804 |
| | | | | 385/28 |
| 5,999,673 | A | 12/1999 | Valentin et al. | |
| 6,167,075 | A | 12/2000 | Craig et al. | |
| 6,434,295 | B1 | 8/2002 | MacCormack et al. | |
| 6,434,302 | B1 | 8/2002 | Fidric et al. | |
| 6,445,855 | B1 | 9/2002 | Stowe et al. | |
| 6,477,295 | B1 | 11/2002 | Lang et al. | |
| 7,693,367 | B2 * | 4/2010 | Nakai | G02B 6/2835 |
| | | | | 385/28 |
| 7,933,479 | B2 | 4/2011 | Gonthier et al. | |
| 7,957,432 | B2 | 6/2011 | Seo et al. | |
| 8,229,262 | B2 | 7/2012 | Inbar et al. | |
| 8,730,456 | B2 * | 5/2014 | Goldberg | G01S 7/4812 |
| | | | | 356/4.01 |
| 8,755,649 | B2 * | 6/2014 | Yilmaz | G02B 6/4207 |
| | | | | 359/333 |
| 8,792,757 | B2 * | 7/2014 | Boudoux | A61B 1/0017 |
| | | | | 385/42 |
| 8,861,910 | B2 * | 10/2014 | Yun | G02B 6/2835 |
| | | | | 385/43 |
| 9,097,853 | B2 * | 8/2015 | Theeg | G02B 6/2835 |
| 2001/0017962 | A1 | 8/2001 | Kim et al. | |
| 2005/0031266 | A1 | 2/2005 | Vakili et al. | |
| 2009/0175575 | A1 * | 7/2009 | Nakai | G02B 6/2835 |
| | | | | 385/28 |
| 2010/0142894 | A1 | 6/2010 | Gonthier | |
| 2010/0183261 | A1 | 7/2010 | Gonthier et al. | |
| 2010/0278486 | A1 | 11/2010 | Holland et al. | |
| 2011/0091155 | A1 * | 4/2011 | Yilmaz | G02B 6/4207 |
| | | | | 385/30 |
| 2011/0226940 | A1 * | 9/2011 | Yun | G02B 6/2835 |
| | | | | 250/227.11 |
| 2012/0154783 | A1 | 6/2012 | Goldberg et al. | |
| 2012/0190928 | A1 | 7/2012 | Boudoux et al. | |
| 2013/0188911 | A1 * | 7/2013 | Theeg | G02B 6/2835 |
| | | | | 385/43 |
| 2013/0222891 | A1 * | 8/2013 | Sayinc | H01S 3/06754 |
| | | | | 359/341.3 |
| 2015/0378105 | A1 * | 12/2015 | Godbout | G02B 6/2835 |
| | | | | 385/43 |

FOREIGN PATENT DOCUMENTS

| | | |
|---|---|---|
| WO | WO2009155536 | 12/2009 |
| WO | WO2010/057288 | 5/2010 |

OTHER PUBLICATIONS

Madore et al., "Asymmetric double-clad fiber couplers for endoscopy", Optics Letters, vol. 38, No. 21, Nov. 1, 2013.

* cited by examiner

ASYMMETRIC OPTICAL FIBER COUPLER

CROSS-REFERENCE TO RELATED APPLICATIONS

The present patent application is a US National Stage of International Application No. PCT/CA2014/050065, filed on Jan. 31, 2014, which claims priority of US provisional Application Ser. No. 61/759,482, filed on Feb. 1, 2013, the contents of which are hereby incorporated by reference.

TECHNICAL FIELD

The present invention relates to the field of optical couplers and more particularly, to such couplers for endoscopy, optical coherence tomography, confocal microscopy and confocal endomicroscopy.

BACKGROUND OF THE ART

Optical fiber couplers are used in many types of imaging and sensing systems with one or more input fibers and one or several output fibers. Such couplers can be fabricated in different ways, for example by thermally fusing fibers so that their cores get into intimate contact. In many medical imaging systems, illumination is provided at a first port of the coupler via a laser source, sampling of an output signal occurs at a second port of the coupler via a scanning device, and detection can occur at both the first port and a third port of the coupler. Various types of detection are possible, depending on the application.

Medical imaging systems based on optical fiber couplers typically face two major challenges: 1) speckle which is an issue related to temporally and spatially coherent imaging when using lasers and single-mode fibers and 2) a theoretical equipartition limit to the amount of the multi-mode signal that can be extracted from the second port to the third port and injected from the third port to the second port.

There is therefore a need to develop optical fiber couplers that can overcome these challenges, and particularly, a need to develop improved optical fiber couplers for medical imaging and sensing applications.

SUMMARY

It is known that the optical couplers of the prior art are limited by the theoretical equipartition limit of multi-modal transmission of 50%, as the first and second fibers was characterized by the same dimension and the same structure (see U.S. patent application No. 2012/0190928, the contents of which are hereby incorporated by reference). The highest multi-modal transmission for such optical couplers was found to be 43%. Although near the theoretical equipartition limit of 50%, achieving near or above 43% was found to be challenging.

There is described herein an asymmetrical optical coupler which has a theoretical limit differing from and not limited to the theoretical equipartition limit of the optical fiber coupler of the prior art. Therefore achieving a multi-modal transmission above than 50% is possible.

It was found that the asymmetry of the optical fiber coupler can be quantified by an etendue ratio which is defined as $G_3/G_1$, where $G_i$ is given by:

$$G_i = \pi S_i (NA_i)^2;$$

where $G_i$ is the etendue of the optical fiber i, $S_i$ is the surface of a cross-section area of a cross-talk portion of the optical fiber i, and NA is the numerical aperture of the optical fiber I at the cross-talk portion. It was also found that by increasing the etendue ratio, the multi-modal transmission can increase asymptomatically towards 100%. Therefore, by designing the first and second optical fibers in a manner which increases the etendue ratio, a multi-modal transmission higher than 50% can be achieved.

In accordance with one aspect, there is provided a multiple-clad optical fiber having a single-mode core guiding a single-mode signal and at least one inner multi-mode cladding guiding multiple modes (also referred to as a multi-mode signal). The multiple-clad fiber can be optically coupled with a second fiber of a different etendue along a coupling region to create an optical fiber coupler having enhanced optical transfer functions bidirectionally between the multiple-clad fiber and the second fiber. The different etendue can be provided by at least one of a different cross-section area and a different numerical aperture.

In accordance with another aspect, there is provided an optical fiber coupler which can achieve a multi-modal transmission above 50%, preferably above 60% and most preferably above 70%.

In accordance with another aspect, there is provided an optical fiber coupler which can be characterized by an etendue ratio above 1.5, preferably above 2, and most preferably above 10.

In accordance with another aspect, there is provided an optical fiber coupler comprising: a first optical fiber having a first cross-talk portion located between a first end and a second end, and having a first single-mode core, at least one inner multi-mode cladding, and a first outer cladding, the first cross-talk portion having a first etendue; a second optical fiber having a second cross-talk portion located between a third end and a fourth end, the second cross-talk portion having a second etendue, the second etendue forming an etendue ratio differing from one relative to the first etendue; and a coupling region where the first cross-talk portion is optically coupled to the second cross-talk portion; wherein the etendue ratio is indicative of a transmission of a multi-mode signal between the second end of the first optical fiber and the third end of the second optical fiber.

In accordance with another aspect, there is provided an optical fiber coupler comprising: a first fiber having a first end, a second end, a first middle portion therebetween and a first cross-section, and having a first core supporting a single guiding mode and a first inner cladding larger than the first core for guiding multiple modes; a second fiber having a third end, a fourth end, and a second middle portion therebetween, and having a second cross-section different from the first cross-section in at least one of structure and dimension, whereby a dimension of the second cross-section is different than a dimension of the first cross-section; and a fused region composed of the first middle portion fused to the second middle portion for a single mode signal to remain in the core from the first end to the second end of the double-clad fiber, and for a multi-mode signal in the first inner cladding to be at least partially transmitted to the second fiber.

In accordance with another aspect, there is provided a method for making an optical coupler comprising: providing a first optical fiber having a first end, a second end, a first cross-talk portion therebetween, and having a first core, at least one inner cladding, and a first outer cladding, the first cross-talk portion having a first etendue; providing a second optical fiber having a third end, a fourth end, a second cross-talk portion therebetween, the second cross-talk portion having a second etendue, the second etendue differing from the first etendue; positioning at least a certain section of the first cross-talk portion of the first optical fiber in contact and along a certain section of the second cross-talk portion of the second optical fiber; and providing heat to both certain sections of the first and second cross-talk portions in a manner forming a fused region; wherein the fused region allows a single-mode signal to remain in the first core between the first end and the second end of the first optical fiber, and for a multi-mode signal in one of the at least one inner cladding to be bidirectionally transmitted to the second fiber.

In accordance with another aspect, there is provided an optical coupler that can be used in an imaging system for interferometric detection, endoscopy, multimodal endoscopy, confocal endomicroscopy, confocal microscopy, non-linear microscopy, nonlinear endomicroscopy, optical coherence tomography, and other applications, as will be described in more detail below.

In one embodiment, the fused region allows nearly loss-less transmission of the single-mode signal along the single-mode core, from the first port to the second port, and vice-versa. More specifically, there is provided an optical fiber coupler which can achieve a mono-modal transmission above 85%, preferably above 90% and most preferably above 95%.

In another embodiment, more than 70% of the multi-mode signal can be extracted from the second port to the third port of the optical coupler. More specifically, more than 50% of the multi-mode signal can be extracted from the at least one inner cladding of the multiple-clad fiber to the second fiber. In some other embodiments, extraction of the multiple-mode signal from the second port to the third port can be comprised between about 60% and about 70%. In some embodiments, extraction of the multiple modes is greater than 50%.

In accordance with another aspect, there is provided an optical coupler that can be used in a therapeutic system based on laser ablation, thermal therapy and/or coagulation. In this case, optical fiber couplers are used to launch an imaging laser through the single-mode core of the multiple-clad fiber and to launch a therapeutic laser in the at least one inner cladding of the multiple-clad fiber through the third port of the fiber coupler.

In another embodiment, more than 50% of the multi-mode signal can be injected from the third port to the second port of the optical coupler. More specifically, more than 50% of the multi-mode signal can be injected from the second fiber to the at least one inner cladding of the multiple-clad fiber.

Many further features and combinations thereof concerning the present improvements will appear to those skilled in the art following a reading of the instant disclosure.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
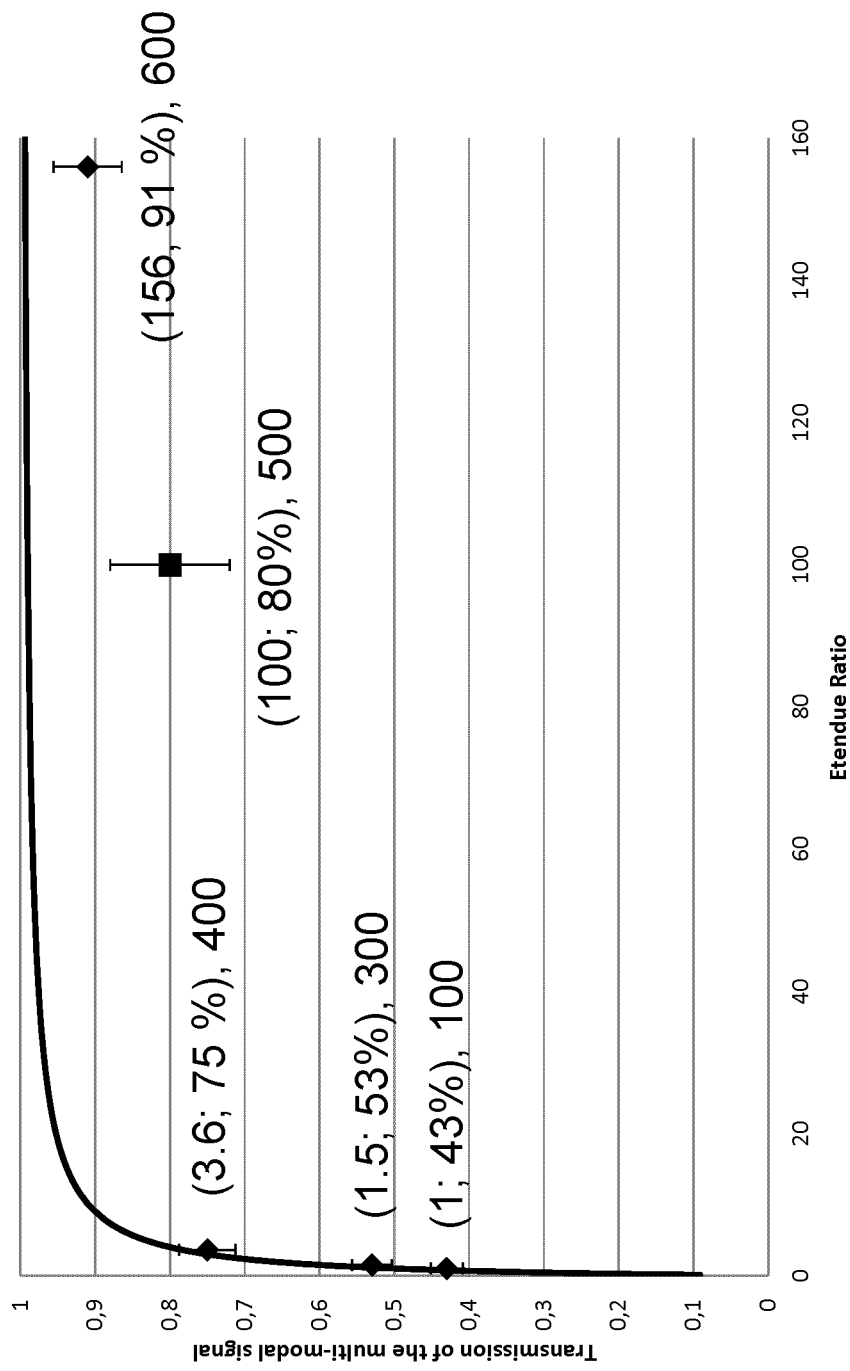
FIG. 1 is a graph showing examples of the transmission of a multi-mode signal from a first optical fiber to a second optical fiber as a function of an etendue ratio.

FIG. 1 is a graph showing examples of the transmission of a multi-mode signal from a first optical fiber to a second optical fiber as a function of an etendue ratio for an optical coupler of the prior art 100. The new theoretical model for asymmetrical optical fiber couplers is represented by the solid line of FIG. 1. More specifically, FIG. 1 shows multi-modal transmissions of 53%, 75%, 80% and 91% for, respectively, asymmetrical optical couplers 300, 400, 500 and 600 as a function of their asymmetry, or their etendue ratio. Each of these asymmetrical optical fiber couplers are illustrated respectively in FIGS. 3, 4, 5, and 6. Moreover, other possible configurations for the asymmetrical coupler are presented in FIGS. 2 to 12.

Figure 2:
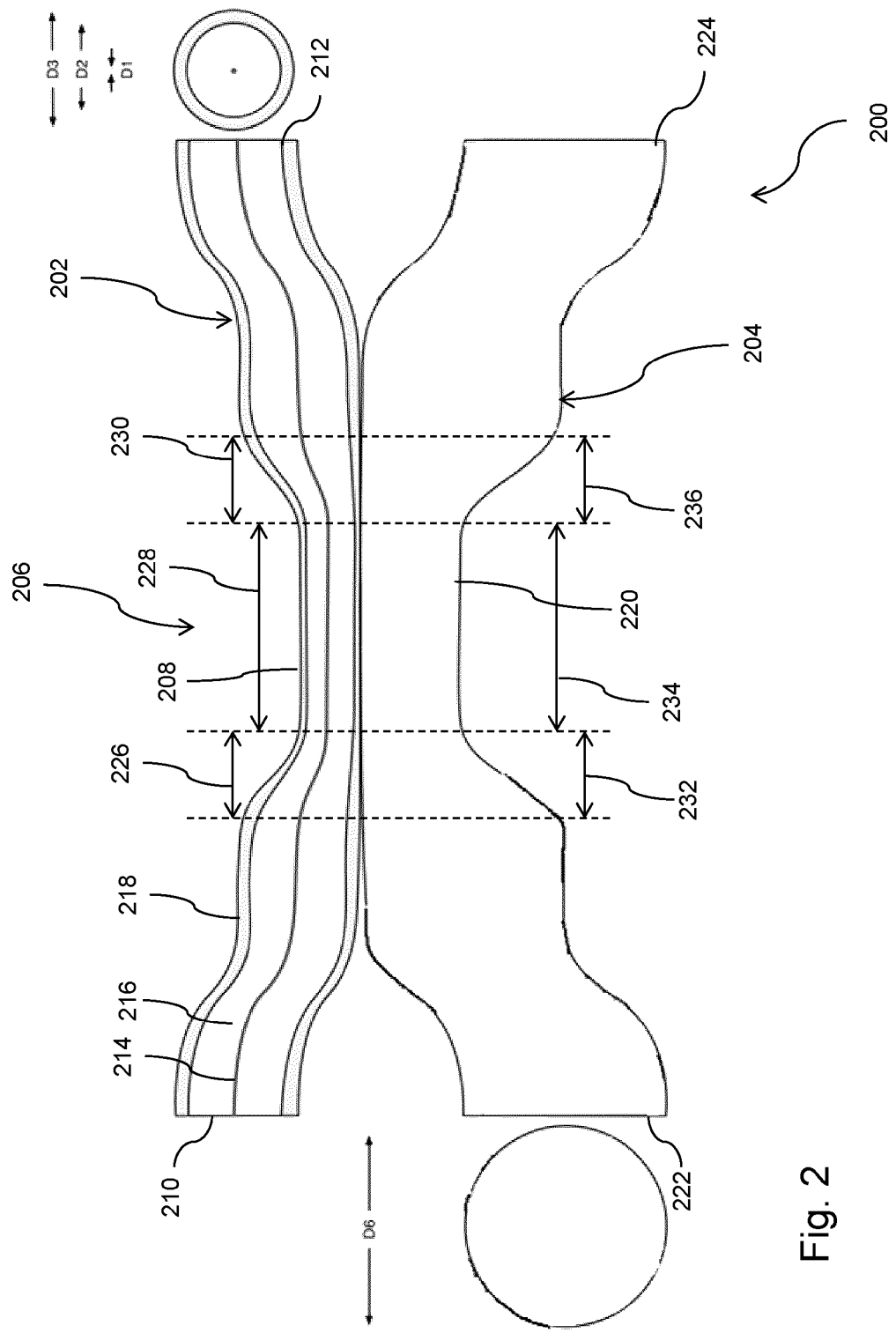
FIG. 2 illustrates a generic embodiment of the optical fiber coupler.

FIG. 2 is a schematic diagram of an optical fiber coupler 200 having asymmetrical geometry and optical transfer functions. A first optical fiber 202 is fused with a second optical fiber 204 at a coupling region 206 (or fused region). The fibers can be fused side by side at high temperature, for example using a micro-torch as a heat source. The coupling region 206 is then pulled and tapered such that its cross-section is reduced, inducing coupling of the light from one fiber to the other. The first optical fiber 202 has a first cross-talk portion 208 between a first end 210 and a second end 212. The first optical fiber 202 also has a first single-mode core 214, a first inner multi-mode cladding 216 and a first outer cladding 218. The second optical fiber 204 has a second cross-talk portion 220 between a third end 222 and a fourth end 224.

Figure 6:
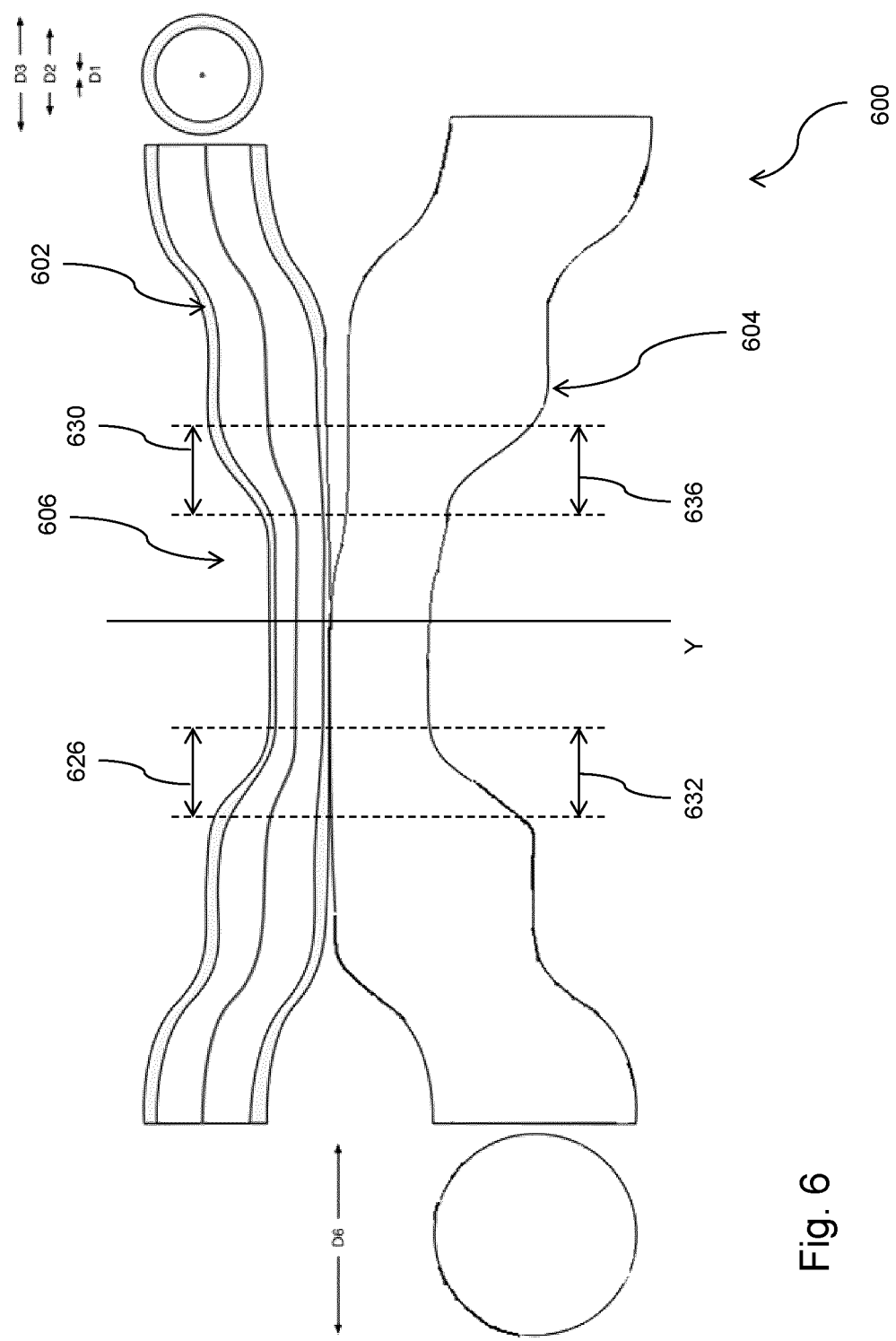
FIG. 6 illustrates an embodiment of the optical fiber coupler having a first double-clad fiber and a second coreless fiber which exhibits asymmetry between a down-stream portion and an up-stream portion of a coupling region.

The multi-modal transmission enhancement can be provided by the difference in etendue between the first cross-talk portion 208 of the first optical fiber 202 and the second cross-talk portion 220 of the second optical fiber 204 (and also by optically coupling the cross-talk portions one to one another along only a portion of their lengths, which can increase and/and amplify the multi-modal transmission, see FIG. 6). This in turn provides asymmetrical optical transfer functions by maintaining a single-mode signal in the single-mode core 214 of the first fiber 202 and transmitting at least part of a multi-mode signal from at least one inner cladding 216 of the first fiber 202 to the second fiber 204. Although the first optical fiber is illustrated as a double-clad fiber (DCF) in FIG. 2, the first optical fiber can be another form of multiple-clad fiber, such as a triple or perhaps even a quadruple inner clad fiber for instance (see FIG. 12).

The coupling region 206 is composed of the cross-talk portion 208 of the first fiber 202 fused to the cross-talk portion 220 of the second fiber 204. In the coupling region 206, the single-mode cores of fibers remain separate. The first cross-talk portion 208 has a first down-stream section 226 (or a first diameter transition section), a first constant diameter section 228, and a first up-stream section 230 (or a second diameter transition section). The second cross-talk portion 220 has a second down-stream section 232, a second constant diameter section 234, and a second up-stream section 236. The first and second down-stream sections 226, 232 are down-tapers of the coupling region 206 and the first and second up-stream sections 230, 236 are up-tapers of the coupling region 206. The coupling region 206 has a predetermined taper ratio. The predetermined taper ratio may vary between about 0.1 and about 0.6.

Figure 3:
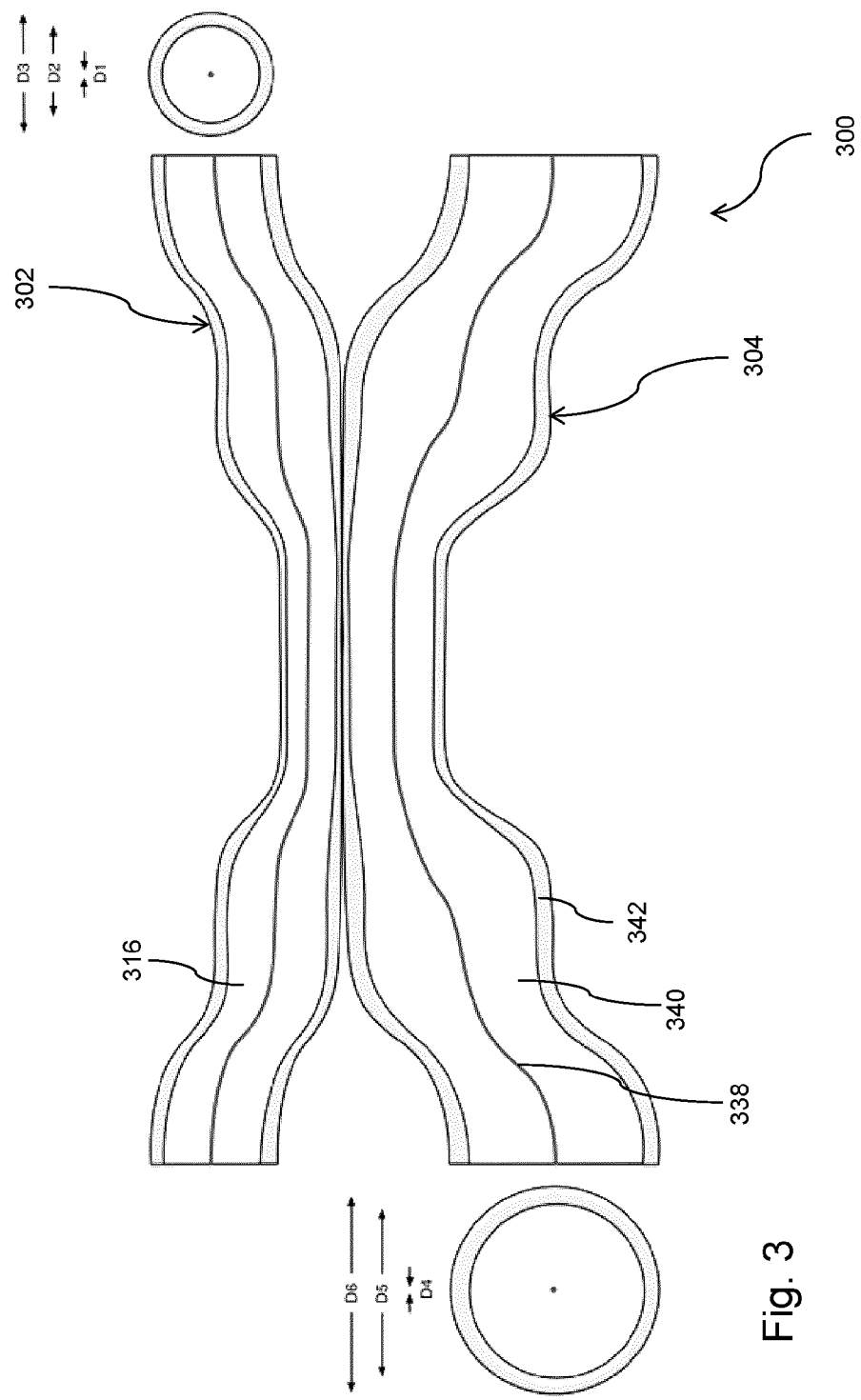
FIG. 3 illustrates an embodiment of the optical fiber coupler having first and second double-clad fibers of different dimensions.

FIG. 3 illustrates an embodiment for the optical coupler 300 whereby the first optical fiber 302 is a double-clad fiber fused with the second optical fiber 304 which is also a double-clad fiber. The second double-clad fiber comprises a second single-mode core 338 that supports a single guiding mode and a second inner multi-mode cladding 340, surrounded by a second outer cladding 342, that guides a multi-mode signal. The first double-clad fiber 302 and the second double-clad fiber 304 may be identical or may have slight differences in terms of dimensions. If so, the first double-clad fiber 304 is tapered to reduce its dimensions while the second double-clad fiber 304 is not, thereby creating the geometrical asymmetry or an etendue difference (which can lead to an etendue ratio above or below one). The first double-clad fiber 302 may be pre-tapered by a factor of about 2 and then fused to a pristine double-clad fiber 304. The structure may be further tapered. The resulting coupler has an etendue difference and may exhibit coupling of the multi-mode portion due to the different diameters of the inner-claddings 316 and 340. Alternatively, the first double-clad fiber and the second double-clad fiber may differ in size in their pristine state.

EXAMPLE 1

An example optical fiber coupler 300 having a general construction as described above with reference to FIG. 3, with first and second optical fiber being characterized with an etendue ratio of 1.5, has reached a multi-modal transmission of 53%.

Figure 4:
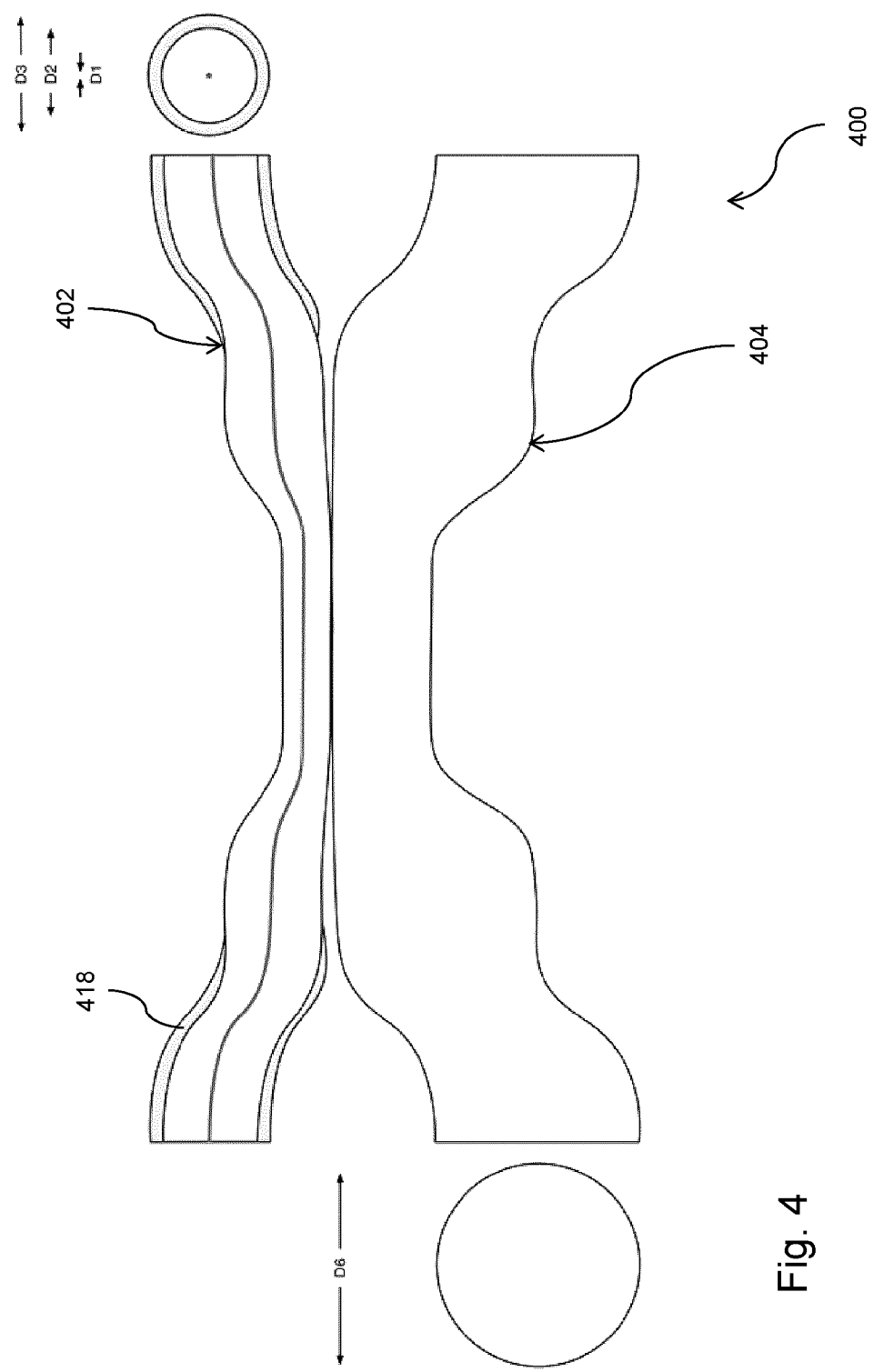
FIG. 4 illustrates an embodiment of the optical fiber coupler having a first chemically etched double-clad fiber.

The asymmetry may be provided using various techniques. For example, the cross-talk portions of the fibers may differ in dimensions and/or structure from their initial construction. Alternatively or in combination therewith, at least one of the two fibers may be transformed post-fabrication and pre-fusion. Transformation may occur using pre-tapering, thus reducing an initial diameter of a fiber. Transformation may also occur using chemical etching, whereby an outer material of one or both fibers is removed. FIG. 4 is an exemplary embodiment illustrating an optical coupler 400 having a double-clad fiber 402 where a portion of an outer cladding 418 has been chemically etched at least along the coupling region 406 and then fused to the second coreless fiber 404. In this example, chemical etching is performed by inserting a fiber segment into a solution of 20% hydrofluoric acid. Other acids may also be used to remove part of the outer cladding. Other processes may be used to remove part of the outer cladding, such as plasma etching or polishing.

EXAMPLE 2

An example optical fiber coupler 400 having a general construction as described above with reference to FIG. 4, with a first optical fiber being a DCF Nufern 9 µm(0.12 NA)/105 µm(0.20 NA)/125 µm and the second optical fiber being a coreless fiber of 200 µm (0.22 NA), characterized with an etendue ratio of 3.6, has reached a multi-modal transmission of 75%.

Figure 5:
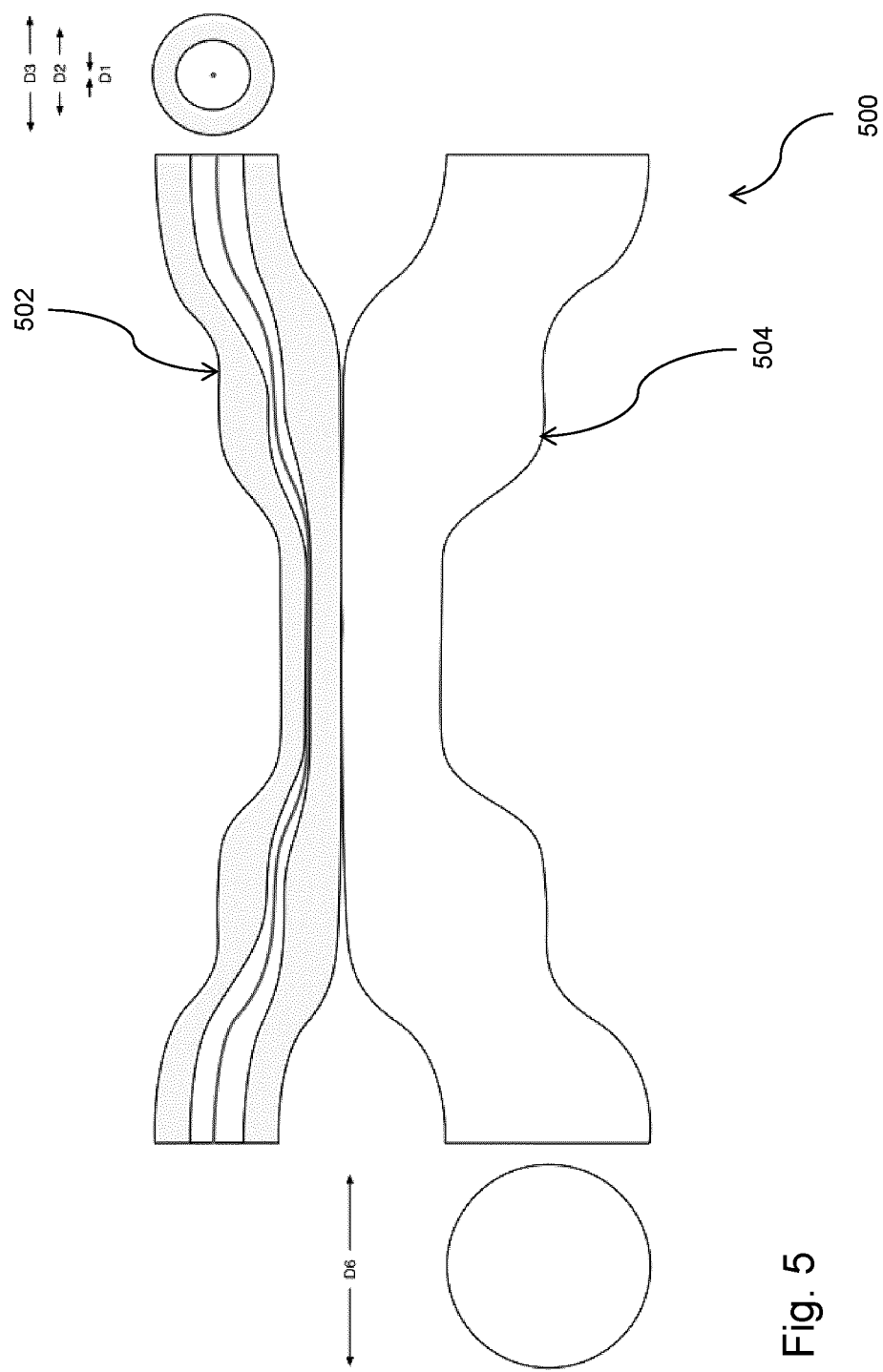
FIG. 5 illustrates an embodiment of the optical fiber coupler having a first optical fiber transformed to obtain an inner single-mode cladding.

FIG. 5 is an exemplary embodiment illustrating an optical coupler 500 having the second coreless fiber 504 fused with a first optical fiber 502 having a first inner single-mode cladding. Moreover, it is tapered in such a way that the fundamental mode of the single-mode core of the DCF is transformed adiabatically, therefore without loss, into the fundamental mode of the reduced inner-cladding. In other words, an inner one of the claddings is tapered to form an inner single-mode cladding enabling the single-mode signal propagating along the single-mode core to propagate substantially losslessly (or adiabatically) along the inner single-mode cladding of the first optical fiber. The inner-cladding is itself rendered a single-mode guiding region owing to its reduction in diameter. The tapered DCF is then fused to another fiber. For example, a 9/50/125 double-clad fiber is pre-tapered with a ratio of approximately 5. The first tapered and adiabatically transformed double-clad fiber 502 is then fused to the multi-mode fiber. The multi-mode fiber may be of standard size or over-sized, and the double-clad fiber may have various ranges of diameters and may be pre-tapered to a different ratio. It has been demonstrated that such an optical fiber coupler can achieve a multi-modal transmission of 80% with an etendue ratio of 100.

EXAMPLE 3

An example optical fiber coupler 500 having a general construction as described above with reference to FIG. 5, with a first optical fiber being a DCF 4.1 µm (0.11 NA)/25.8 µm (0.19 NA)/125 µm, the second optical fiber being a coreless fiber of 125 µm (0.5 NA) and a DCF fiber being tapered by 0.1 ITR characterized with an etendue ratio of 100, has reached a multi-modal transmission of 80%.

Turning now to FIG. 6, there is illustrated an embodiment for the optical coupler 600 whereby the first optical fiber 602 is a double-clad fiber and the second optical fiber 604 is a coreless fiber. In this embodiment, the first double-clad fiber 602 is tapered and adiabatically transformed before being fused to the coreless fiber 604. In both fibers, multiple modes are trapped by the glass/air interface. The fused structure allows complete mixing of the multiple modes and a distribution of power proportional to the guiding areas.

In some embodiments, the structure can be fabricated such that the down-tapers 626, 632 of the double-clad fiber 602 is fused to the coreless fiber 604, but not the up-tapers 630, 636. This is illustrated in FIG. 6 in combination with the coreless fiber, but may be provided with any of the other first optical fiber/second optical fiber configurations described herein. This produces an asymmetry about a transverse axis Y, which is centered in the coupling region 606, but can also be provided at various positions upstream and downstream within the coupling region 606. The coupling region thus comprises a fused portion and a non-fused portion. This feature minimizes the back-coupling into the cladding of the double-clad fiber.

In one exemplary embodiment, the double-clad fiber has dimensions of 9/50/125 that has been tapered with a ratio of approximately 5 and the coreless fiber is a coreless -/-/125 fiber. The ratio of areas being 25, the structure allows a 4/96% multi-mode coupling ratio, where the greater portion is extracted out of the double-clad fiber. The coreless -/-/125 fiber may be end-fused to a -/200/220 multi-mode fiber at end to avoid losses caused by the polymer jacket present over the fiber outside the coupling region. Other exemplary dimensions for the double-clad fiber are 4.5/105/125 and 4.5/30/125.

The asymmetric optical fiber coupler described herein may thus be composed of a double-clad fiber in combination with anyone of a coreless fiber, a single-mode fiber, a multi-mode fiber, and a double-clad fiber. When combining the double-clad fiber with another double-clad fiber, asymmetry is created by having the respective cross-sections of the fibers differ in dimensions. In all other cases, the respective cross-sections of the fibers will differ in structure in view of the different types of fibers fused together. These configurations may also have cross-sections that differ in dimensions in addition to structure. The optical fiber coupler may have double asymmetry, such as that illustrated in FIGS. 6 and 9.

EXAMPLE 4

An example optical fiber coupler 600 having a general construction as described above with reference to FIG. 6, with a first optical fiber being a custom DCF 9 µm (0.12 NA)/105 µm (0.19 NA)/125 µm, the second optical fiber being a coreless fiber of 250 µm (0.5 NA) and a DCF fiber being tapered by 0.5 ITR characterized with an etendue ratio of 156, has reached a multi-modal transmission of 91%.

Figure 7:
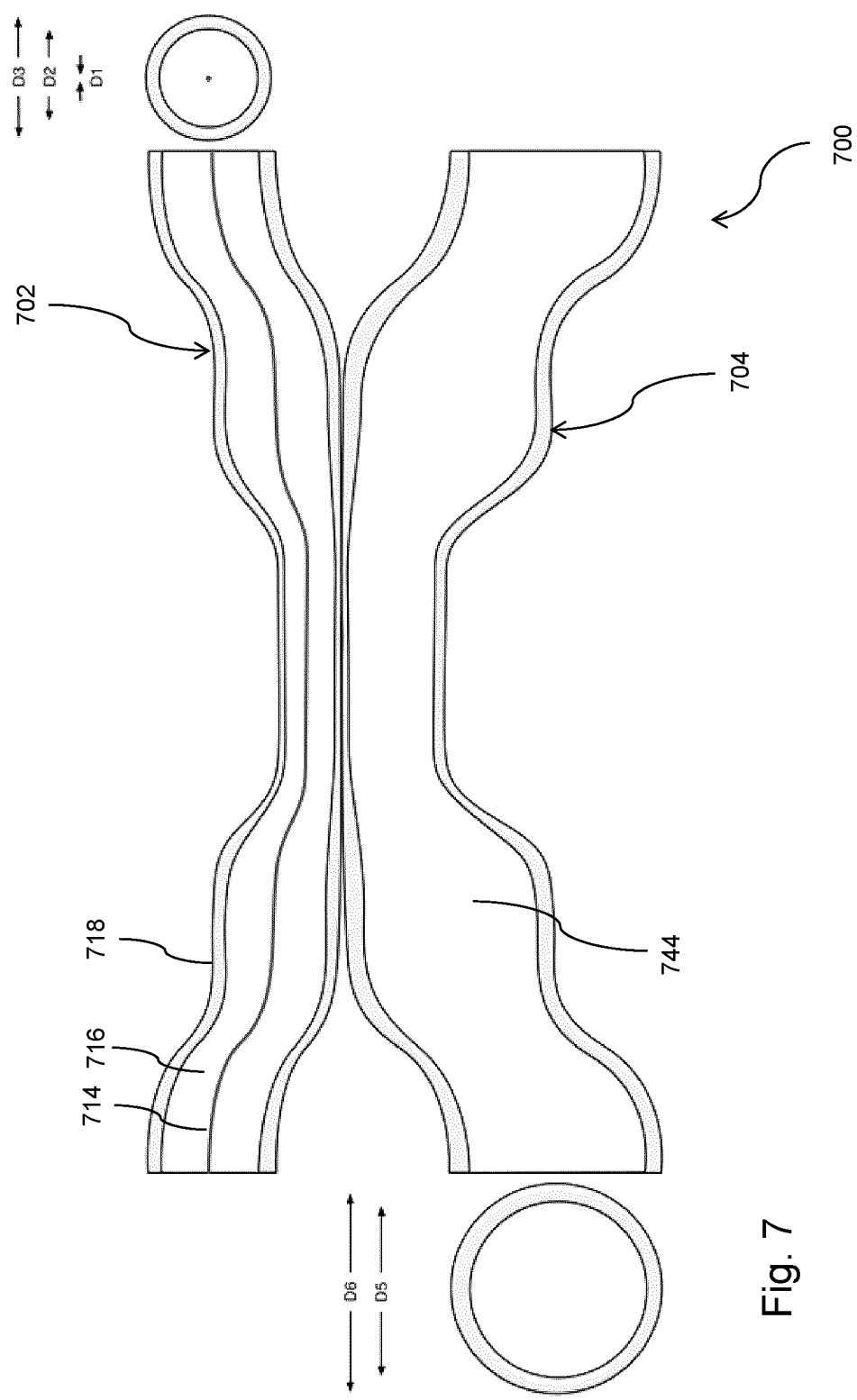
FIG. 7 illustrates an embodiment of the optical fiber coupler having a first double-clad fiber and a second multi-mode fiber.

Reference is made to FIG. 7, which illustrates an optical coupler 700 having first optical fiber 702 having a single-mode core 714 that guides the single-mode signal. A larger inner cladding 716, surrounded by an outer cladding 718, guiding multiple modes. The double-clad fiber may be fused with different optical fibers in order to create the asymmetric coupler. Some exemplary materials for the double-clad fiber are various polymer and glass types, such as silica (pure or doped).

In some embodiments, the second optical fiber 704 is a multi-mode fiber. The larger core 744 supports multi-mode signals and is surrounded by a cladding. The multi-mode fiber may have a step-index profile or a graded-index profile. Post-fusion stretching of the structure to reduce the original dimensions by a factor comprised between about 2 and about 3 will allow the light in the core 714 of the double-clad fiber 702 to remain in the single-mode core 714 while allowing the light in the larger inner cladding 716 to escape in part to the multi-mode fiber 704.

Various size combinations are possible between the double-clad fiber 702 and the multi-mode fiber 704. For example, the double-clad fiber may have diameters D1/D2/D3 of 9/105/125 while the multi-mode fiber may have diameters D5/D6 of 220/240. This particular combination allows an approximate 23/77% multi-mode coupling ratio, the larger portion coming out of the multi-mode fiber. The diameter D1 of the core may vary between about 3.0 µm and about 10.0 µm, +/−20%. The diameter D3 of the outer cladding may vary between about 80 µm and about 200 µm, +/−20%. The diameter D2 of the inner cladding may also vary. It may be as large as possible while allowing enough spacing with the outer cladding to guide light substantially losslessly. For example, the spacing may be about 10.0 µm or greater while being limited by the diameter D3 of the outer cladding. The diameters D5/D6 of the multi-mode fiber may be 125/250, 110/140, 165/190, 430/530, or other possible combinations, provided the desired asymmetry is obtained for the optical coupler.

The double-clad fiber may be pre-tapered or pristine. In the case of a pre-tapered double-clad fiber, the reduction in size of the diameters D1/D2/D3 may allow it to be fused with a multi-mode fiber of a smaller size than if the double-clad fiber is not pre-tapered. When created from commercially available segments, the optical coupler may be obtained using a computer-controlled fusion and tapering setup. In one embodiment, this setup consists of a traveling oxygen-propane micro-torch on a three-axis motorized stage and of two linear stages for stretching. Other setups may also be used. Alternatively, various fabrication techniques may be used to create the optical coupler without starting from commercially available segments.

Figure 8:
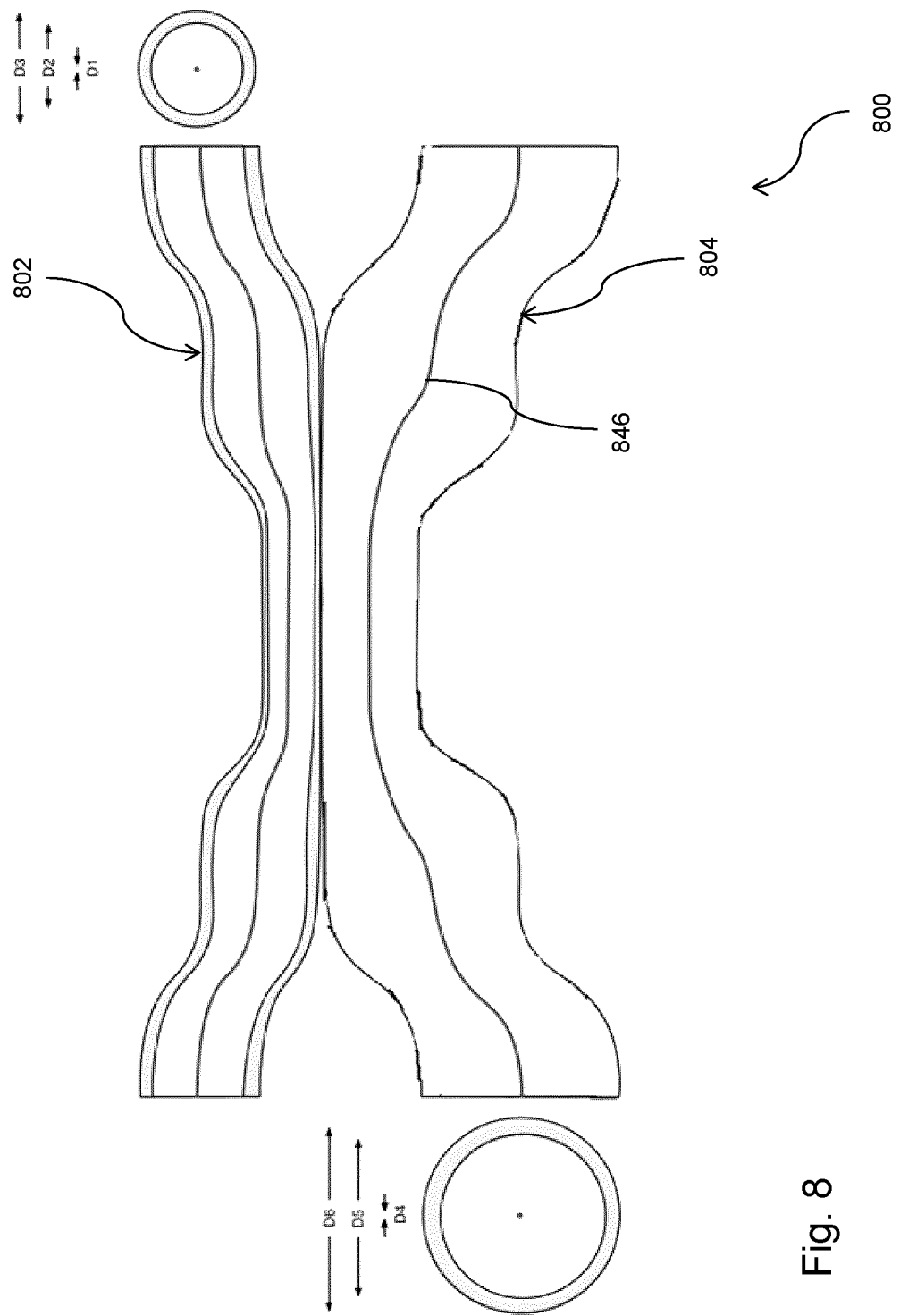
FIG. 8 illustrates an embodiment of the optical fiber coupler having a first double-clad fiber and a second single-mode fiber.

FIG. 8 illustrates an embodiment whereby an optical coupler 800 having a second optical fiber 804 that is a single-mode fiber is fused with the double-clad fiber 802. The single-mode fiber comprises a core 846.

In one embodiment, the asymmetry can be harnessed to maximize the injection of a multi-mode signal from the third port of the second optical fiber into the inner cladding of a multiple-clad fiber, while preserving the core light in the multiple-clad fiber with negligible loss. In such an embodiment, the second optical fiber may be a multi-mode fiber.

Figure 9:
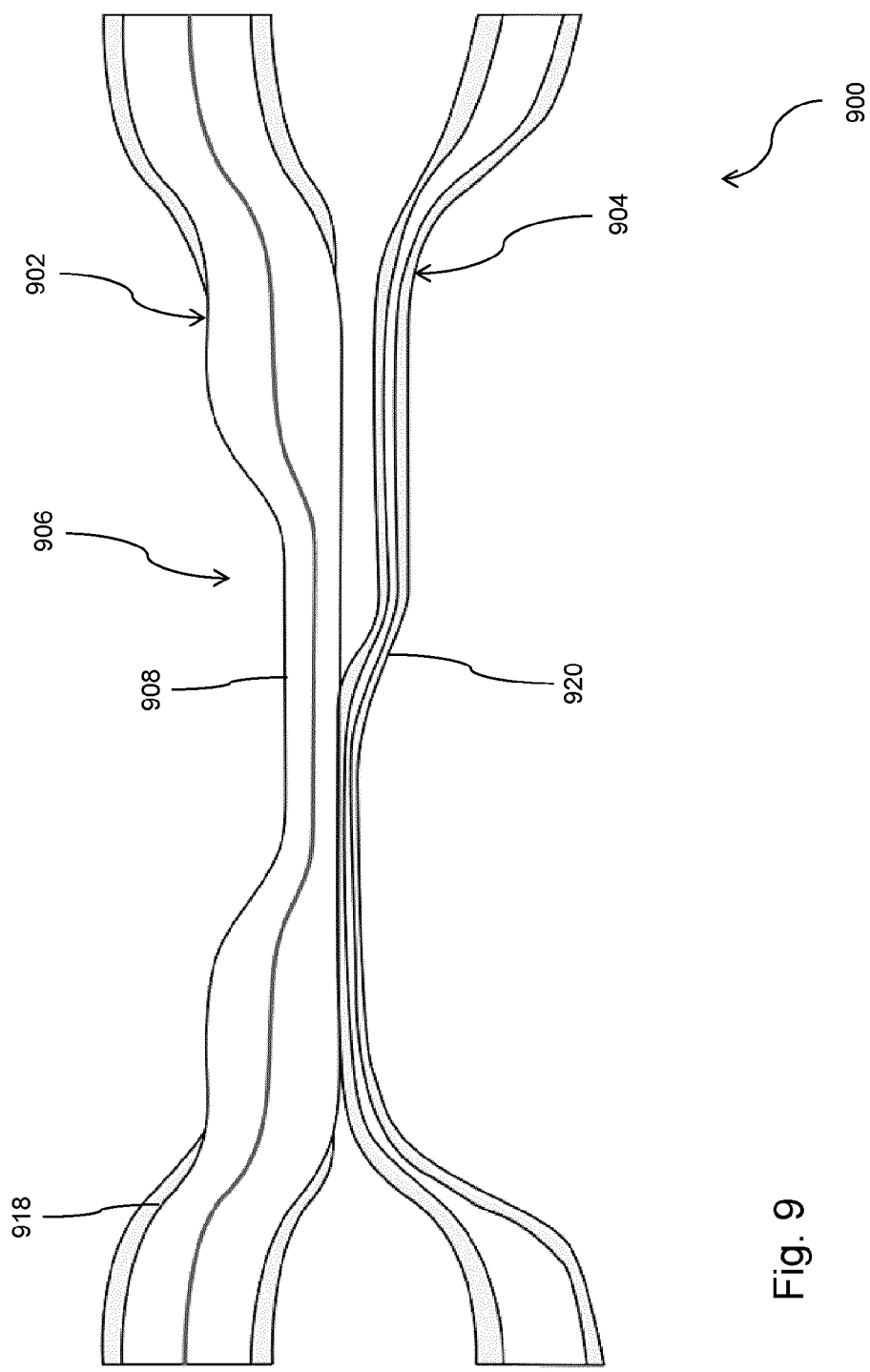
FIG. 9 illustrates an embodiment of the optical fiber coupler having a first chemically etched double-clad fiber and a second pre-tapered multi-mode fiber wherein the first and second fibers are fused only in a down-stream portion of a coupling region.

FIG. 9 shows an exemplary embodiment 900 where the first optical fiber 902 is a double-clad fiber that has been chemically etched so as to remove the outer cladding 918 along the coupling region 906, and the second optical fiber 904 is a multi-mode fiber that has been pre-tapered, and both cross-talk regions 908 and 920 have been fused only along a given portion of their lengths. The double asymmetry thus obtained provides favorable transmission of a multi-mode signal guided from the multi-mode fiber 104 into the inner cladding of the double-clad fiber. For example, a 9/105/125 double-clad fiber is fused to a 25/125 multi-mode fiber, pre-tapered by a ratio of 8 before fusion with the double-clad fiber. 66% transmission from the multi-mode fiber to the inner cladding of the double-clad fiber may thus be obtained. With such an embodiment, it has been shown that when injecting a multi-mode signal from the third end of the second optical fiber to the second end of the first optical fiber, the etendue ratio can be 1/2704 while when extracting a multi-mode signal from the second end of the first optical fiber to the third end of the second optical fiber, the etendue ratio can be 2704.

EXAMPLE 5

An example optical fiber coupler 900 having a general construction as described above with reference to FIG. 9, with a first optical fiber being a custom DCF 9 µm (0.12 NA)/105 µm, the second optical fiber being a multimodal fiber of 25.8 µm (0.19 NA) and the multimodal fiber being tapered by 0.5 ITR characterized with an etendue ratio of 1/2704, has reached a multi-modal injection of 66%.

Figure 10:
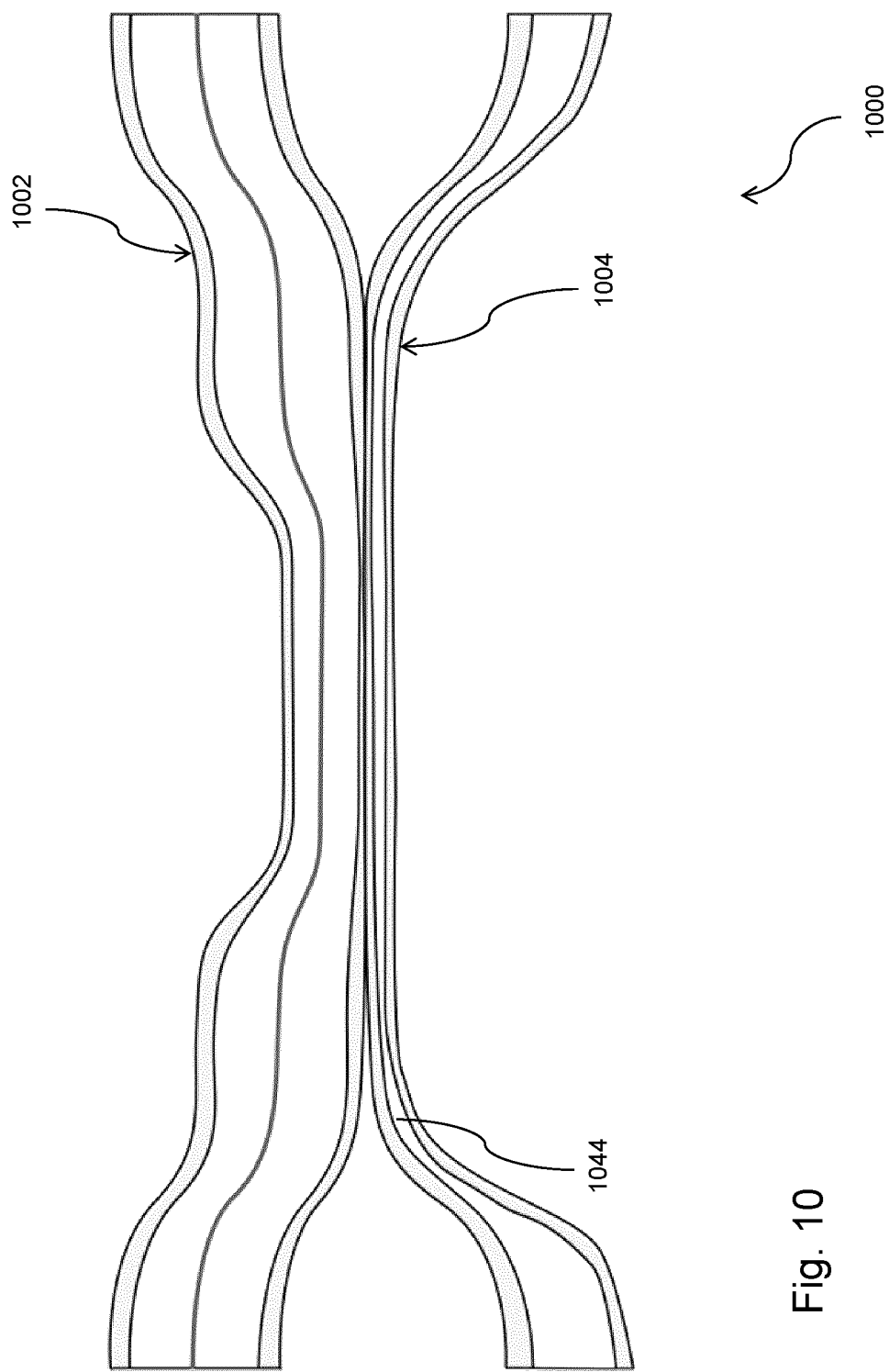
FIG. 10 illustrates an embodiment of the optical fiber coupler having a second pre-tapered multi-mode fiber.

FIG. 10 shows an exemplary embodiment of the optical coupler 1000 where the multi-mode fiber 1004 has been pre-tapered prior to fusion with the double-clad fiber 1002. The tapered portion of the multi-mode fiber is made longer than the fused portion. In the tapered portion of the multi-mode fiber 1004 light escapes from the large core 1044 into the outer cladding. In the up-taper portion of the coupler, a multi-mode signal is preferably guided in the larger double-clad fiber, therefore providing more than 50% of bidirectional transmission from the multi-mode fiber to the inner cladding of the double-clad fiber.

Figure 11:
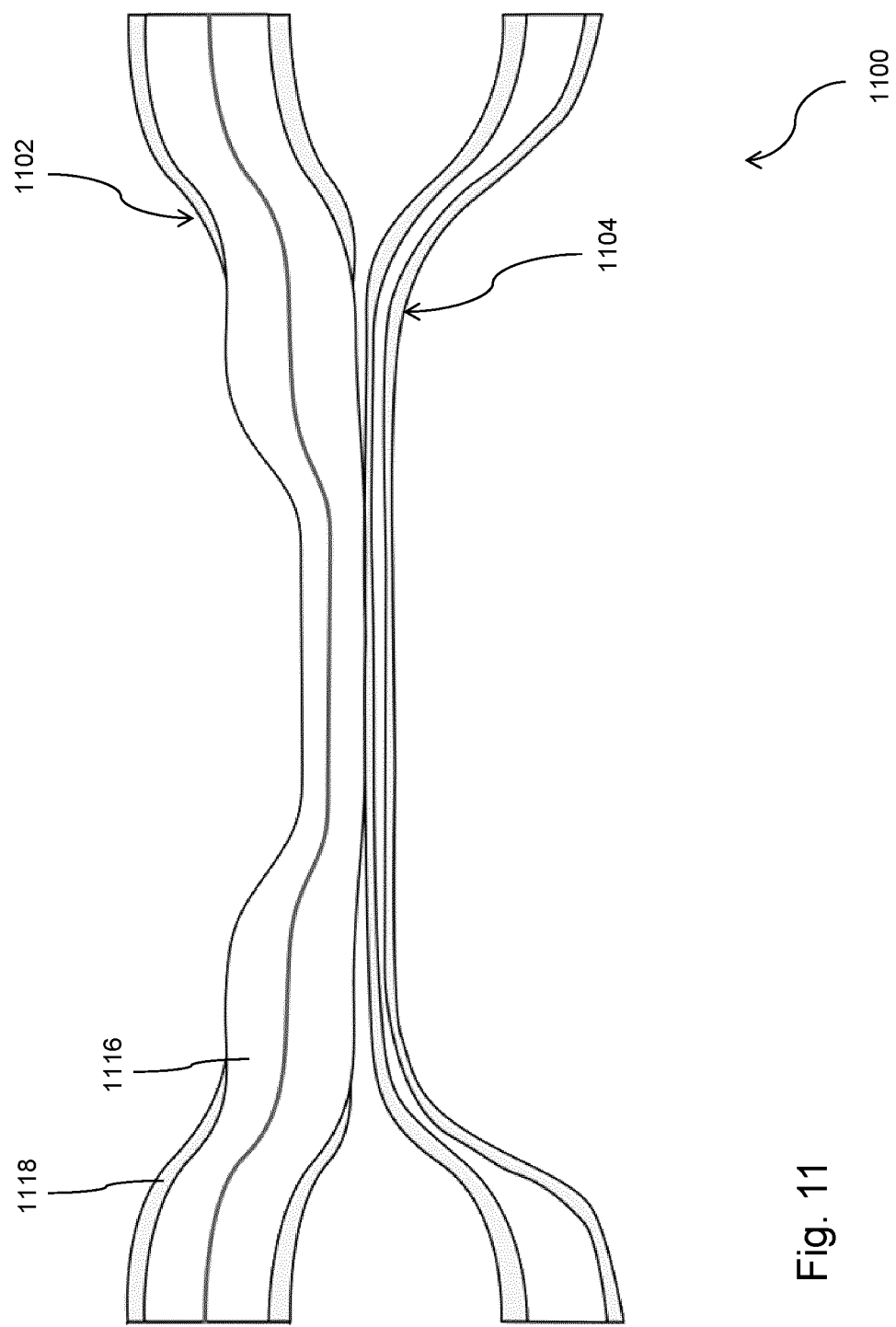
FIG. 11 illustrates an embodiment of the optical fiber coupler having a first chemically etched double-clad fiber and a second pre-tapered multi-mode fiber.

FIG. 11 shows an exemplary embodiment of the optical coupler 1100 where the double-clad fiber 1102 has been chemically etched so as to remove the outer cladding 1118, and the multi-mode fiber 1104 has been pre-tapered. Removal of the outer cladding 1118 of the double-clad fiber 1102 facilitates transfer of the multi-mode signal into its inner cladding 1116.

In one embodiment, the fabrication process begins by stripping the cross-talk portions of the first optical fiber and second optical fiber from their coating and cleaning them with acetone. The cross-talk portions fibers are pressed together by holding clamps containing V-shaped grooves and inspected with a microscope mounted over the setup. For on-line characterization of the core mode transmission, the first optical fiber is spliced with a single-mode fiber (SMF) on both ends and connected respectively to a broadband source and to an optical spectrum analyzer. The two fibers are fused side-by-side with a micro-torch traveling over 4-8 mm along the fibers for approximately 2 minutes. The coupling region is then stretched, at a slightly lower flame temperature, at a stretching rate of 0.1 mm/s, with the micro-torch traveling back-and-forth along a constant 8 mm length. The device may be packaged on a quartz substrate while still under tension on the setup and then inserted in a stainless steel tube. Core signal transmission of the exemplary double-clad fiber coupler (DCFC) may be monitored during fabrication with a conventional broadband source and an optical spectrum analyzer.

Figure 12:
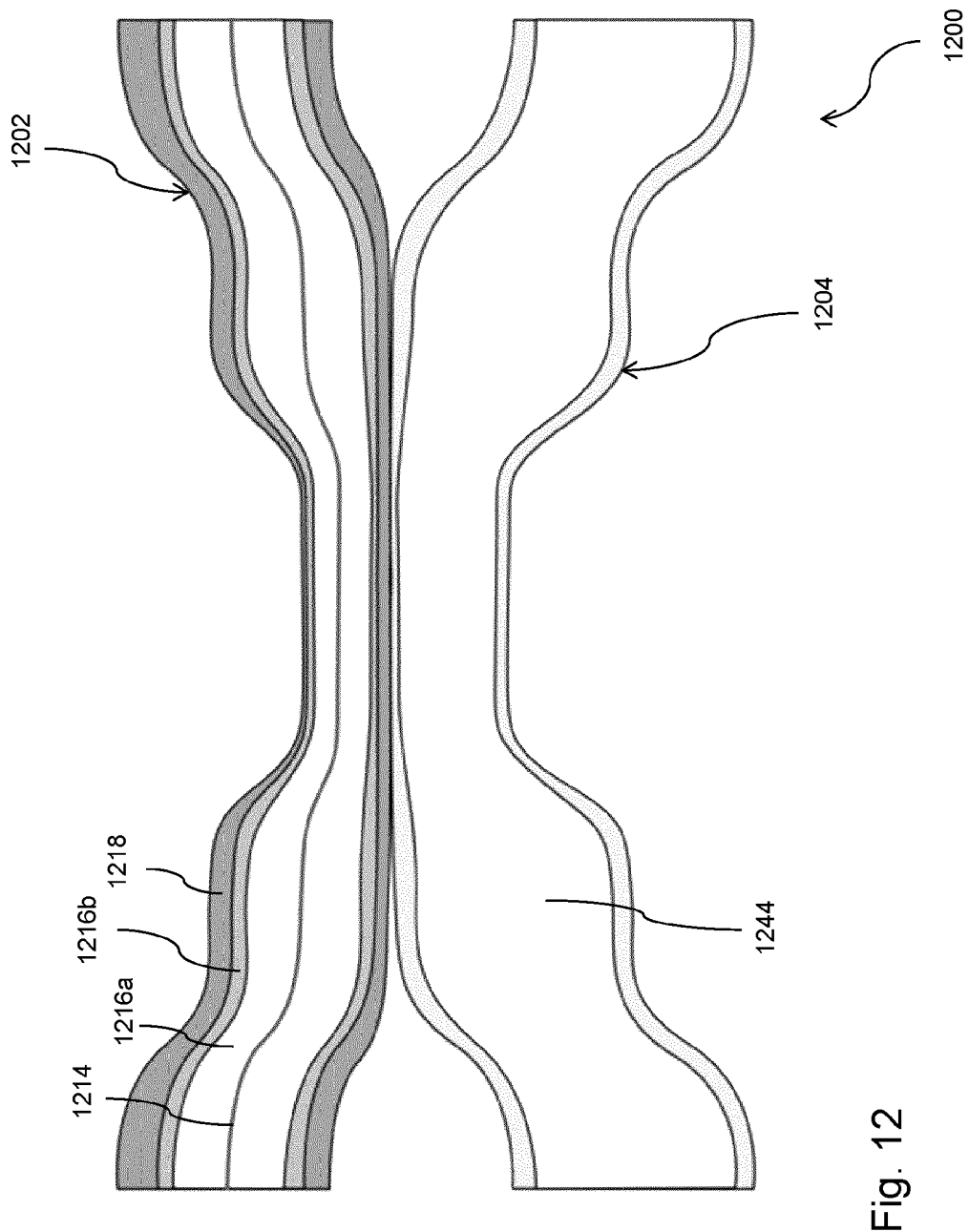
FIG. 12 illustrates an embodiment of the optical fiber coupler having a first optical fiber having a first single-mode core, first inner claddings and a first outer cladding and a second multi-mode fiber.

FIG. 12 shows an exemplary embodiment of the optical coupler 1200 where the first optical fiber 1202 is a triple-clad fiber and the second optical fiber 1204 is a multimode fiber. The first triple-clad fiber 1204 has a single-mode core 1214, first inner multi-mode claddings 1216a and 1216b, and a first outer cladding 1218. In this case, the multi-mode signal can be transmitted from the larger core 1244 of the second optical fiber 1204 to the larger one of the first inner multi-mode claddings 1216a and 1216b. In this specific example illustrated in FIG. 12, the first inner multi-mode cladding 1216a can be large enough to guide the multimode signal. The etendue of the first optical fiber can be calculated based on the NA of the conducting first inner multi-mode cladding, for instance.

The asymmetric optical couplers illustrated heretofore harness the asymmetry to maximize the extraction of a multi-mode signal from a multiple-clad fiber. This allows the assembly of biomedical imaging systems (such as endoscopy, confocal endomicroscopy, spectroscopy) operating at the theoretically minimal amount of signal loss for both the single-mode and the multi-mode portions. It also supports the combination of modalities. The design is capable of collecting >70% of light from the inner cladding area, while still transmitting nearly all the single-mode signal over a wide spectral region (1250 nm to 1350 nm). This design allows for an improvement of the signal to noise ratio, which can be used to detect weaker signals (such as fluorescence or Raman) or to image in vivo samples faster. The asymmetric optical coupler may also be implemented in a spectral endoscopy (SEE) setup, which allows the acquisition of speckle-free images (1000×1000 pixels) at 30 frames per second. Three-dimensional reconstructions may be created by coupling the core signal to an interferometer. Some of the setups and techniques described in co-pending United States application bearing publication No. 2012/0190928, the contents of which are hereby incorporated by reference, were repeated with the present optical coupler.

Figure 13:
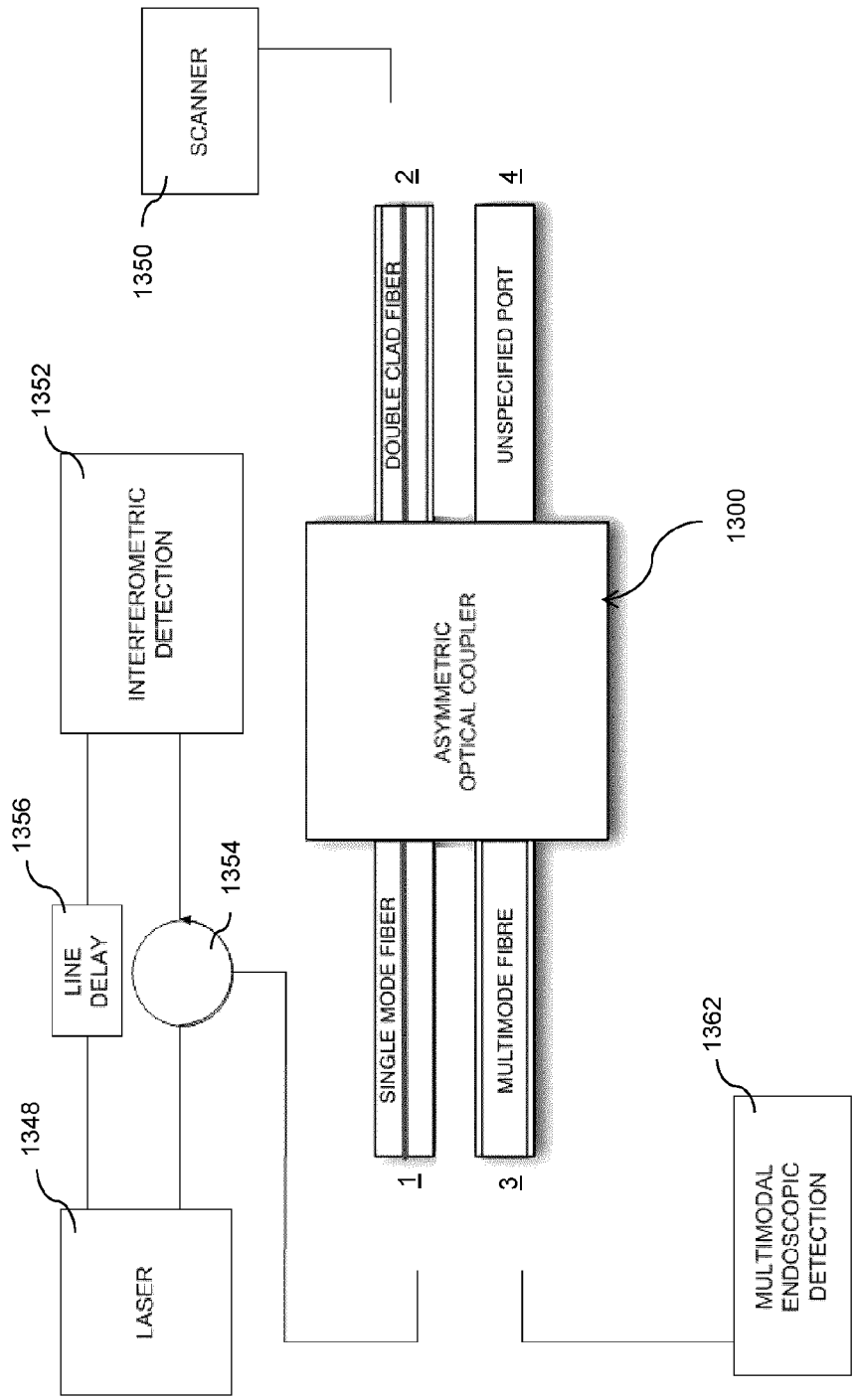
FIG. 13 illustrates an exemplary setup for single fiber endoscopy using an asymmetrical optical fiber coupler.

FIG. 13 is an exemplary embodiment of a setup for single fiber endoscopy using the asymmetric optical coupler 1300, for instance. A laser 1348 provides illumination at port 1 of the coupler 1300. A scanner 1350 samples the signal output from port 2. Three-dimensional interferometric detection 1352 occurs via port 1 through the circulator 1354 and through line delay 1356. Multimodal endoscopic detection 1362 (fluorescence, Raman, Spectroscopy) may be performed via port 3 of the coupler 1300. In this setup, the asymmetric optical coupler 1300 removes speckle from the detection performed at both ports 1 and 3.

Figure 14:
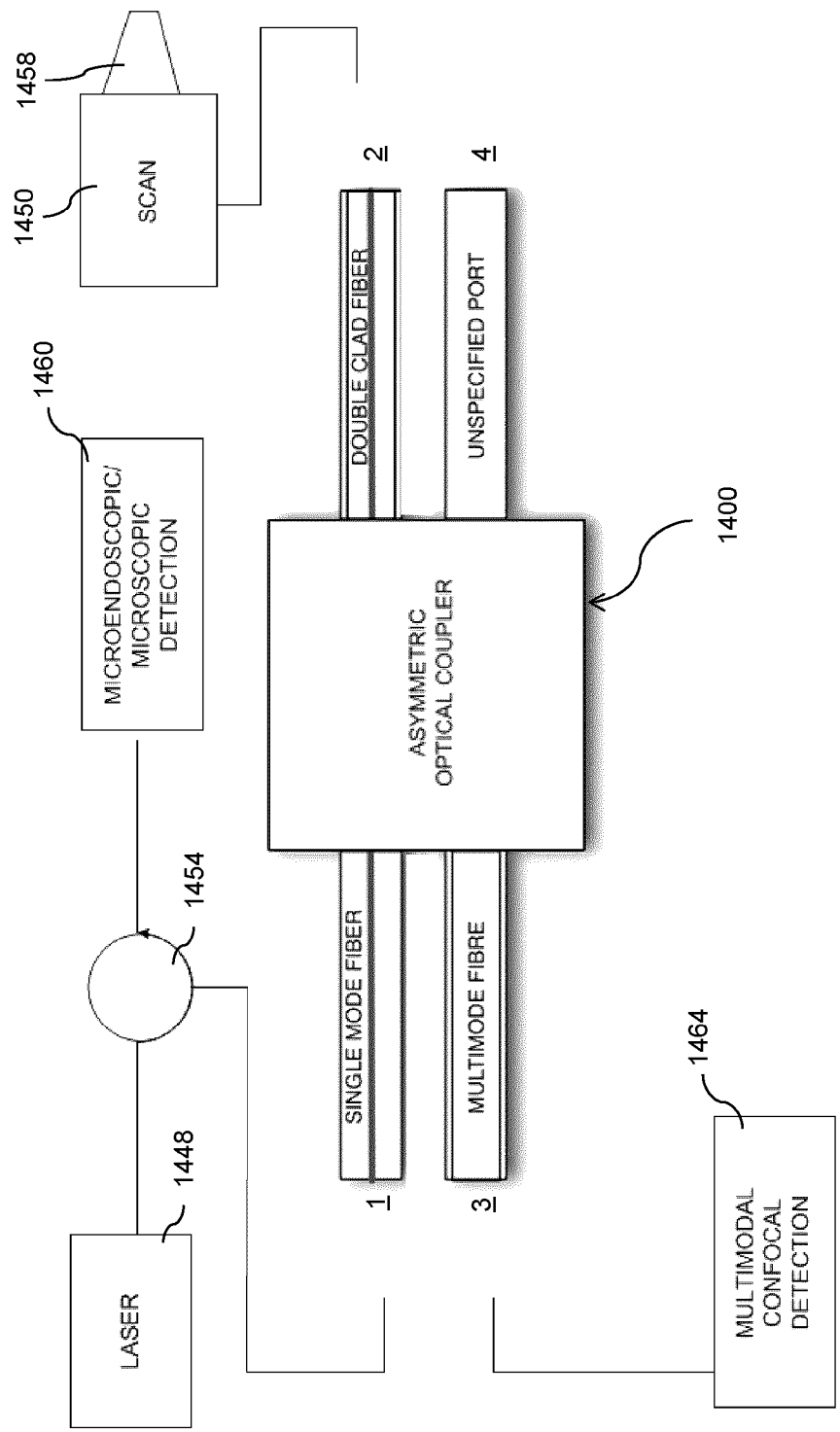
FIG. 14 illustrates an exemplary setup for confocal microendoscopy/microscopy using the asymmetrical optical fiber coupler.

FIG. 14 is an exemplary embodiment of a setup for confocal microendoscopy/microscopy using the asymmetric optical coupler 1400. A laser 1448 provides illumination at port 1 of the coupler 1400. A scanner 1450 with a tapered end 1458 (as described in co-pending United States application bearing publication No. 2012/0190928) samples the signal output from port 2. Endoscopic detection 1460 occurs via port 1 through the circulator 1454. Multimodal confocal detection 1464 (fluorescence, Raman, Spectroscopy) may be performed via port 3 of the coupler 1400. In this setup, the asymmetric optical coupler again removes speckle from the detection performed at both ports 1 and 3.

Figure 15:
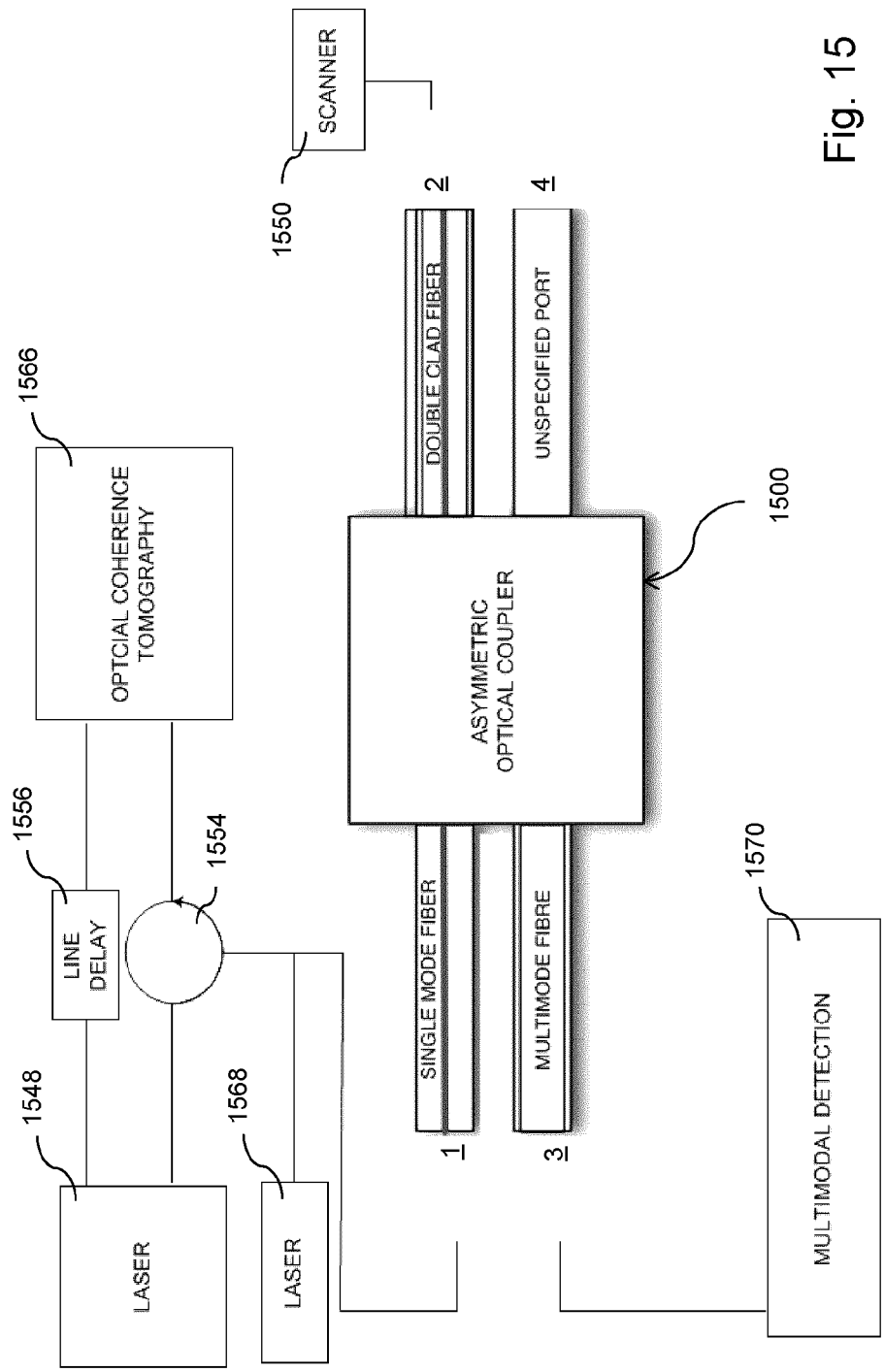
FIG. 15 illustrates an exemplary setup for combined optical coherence tomography and fluorescence (or Raman) detection using the asymmetrical optical fiber coupler.

FIG. 15 is an exemplary embodiment of a setup for optical coherence tomography (OCT) and multimodal detection using the asymmetric optical coupler 1500. A first laser 1548 provides illumination at port 1 of the coupler 1500 for the OCT. A scanner 1550 samples the signal output from port 2. OCT detection 1566 occurs via port 1 through the circulator 1554 and through line delay 1556. A second laser 1568 provides illumination at port 1 for multimodal detection 1570 (fluorescence, Raman, Spectroscopy) performed via port 3 of the coupler 1500.

Figure 16:
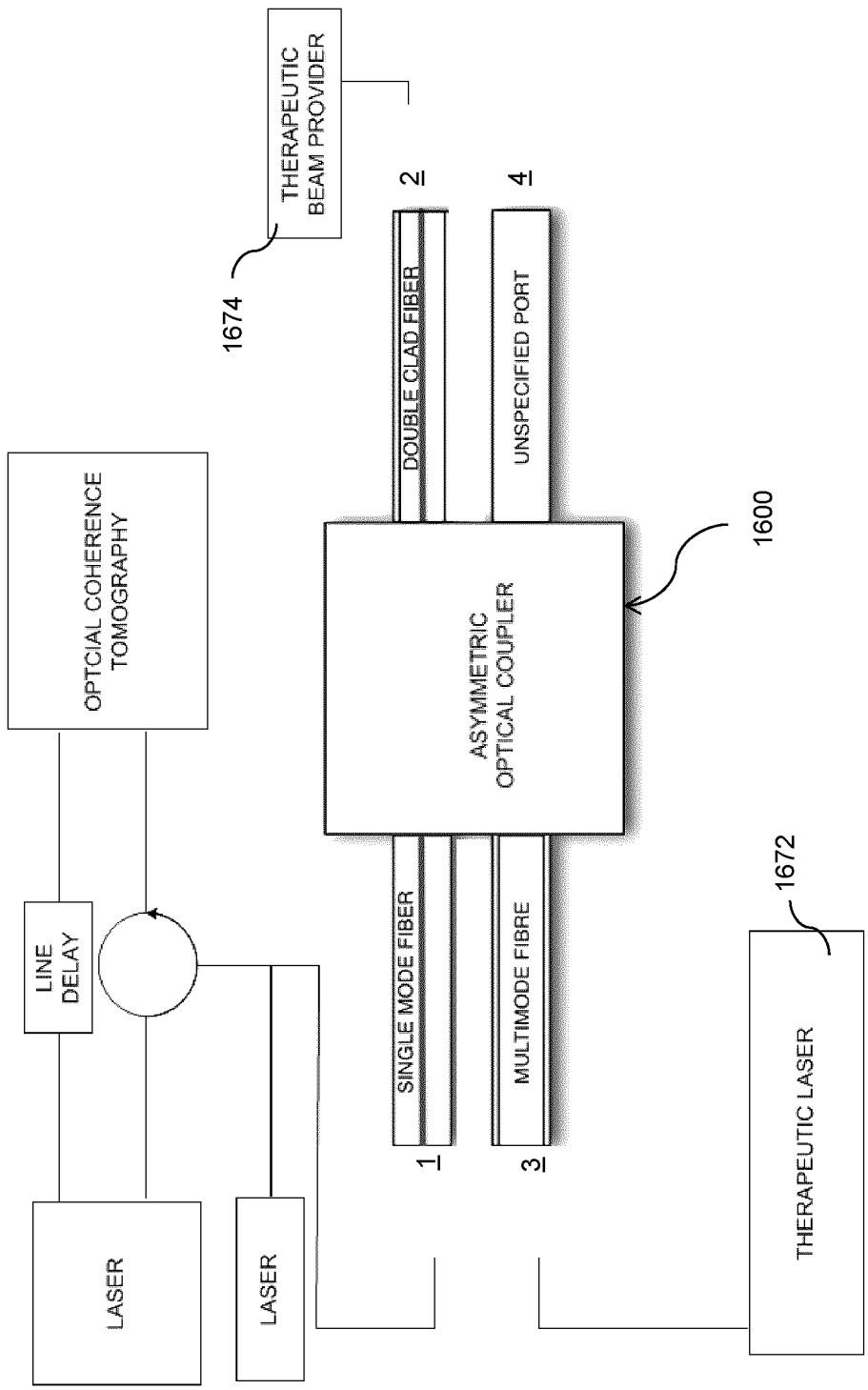
FIG. 16 illustrates an exemplary setup for an image guided therapeutic system using the asymmetrical optical fiber coupler.

FIG. 16 also illustrates an example of an image guided therapeutic system for laser ablation using the asymmetric optical coupler 1600, thermal therapy and/or coagulation. In this embodiment, a therapeutic laser 1672 can be injected into the port 3 of the second optical fiber. The asymmetric optical coupler 1600 can therefore propagate a therapeutic beam from port 3 to port 2, where it can be provided to a sample using a therapeutic beam provider 1674. When using a therapeutic system, the asymmetric optical couplers presented in FIGS. 2 to 8 can be used, However, the optical couplers presented in FIGS. 9, 10 and 11 are preferred.

It is understood that although a therapeutic system using the asymmetric optical coupler is shown concurrently with a setup for OCT, the therapeutic system using the asymmetric optical coupler can be used independent from any detection schemes as well as with other detection schemes through port 1. In all embodiments described heretofore, the double-clad fiber may be replaced by a multiple-clad fiber containing a core, multiple inner claddings, and an outer cladding, wherein any two consecutive regions have different refractive indices.

Other setups to harness the asymmetry of the optical coupler for purposes of maximizing light extraction and/or removing speckle may also be provided. The embodiments of the invention described above are intended to be exemplary only. The scope of the invention is therefore intended to be limited solely by the scope of the appended claims.

The invention claimed is:

1. An optical fiber coupler comprising:
    a first optical fiber having a first cross-talk portion located between a first end and a second end, and having a first single-mode core, at least one inner multi-mode cladding, and a first outer cladding, the first cross-talk portion having a first etendue;
    a second optical fiber having a second cross-talk portion located between a third end and a fourth end, the second cross-talk portion having a second etendue, the second etendue forming an etendue ratio differing from one relative to the first etendue; and
    a coupling region where the first cross-talk portion is optically coupled to the second cross-talk portion;
    wherein the etendue ratio is indicative of an extraction of more than 50% of a multi-mode signal from the at least one inner multi-mode cladding of the first optical fiber at the second end to the third end of the second optical fiber while maintaining a single-mode signal in the first single-mode core,
    wherein a first cross-sectional area of the at least one inner multi-mode cladding of the first optical fiber is different from a second cross-sectional area of the second optical fiber, and
    wherein an inner one of the at least one inner multi-mode cladding is tapered to form an inner single-mode cladding, such that a fundamental mode of the first single-mode core is adiabatically transformed into a fundamental mode of the inner single-mode cladding and the inner single-mode cladding is transformed into a single-mode guiding region.

2. The optical fiber coupler of claim 1, wherein the extraction of the multi-mode signal is above 60%.

3. The optical fiber coupler of claim 2, wherein the extraction of the multi-mode signal is above 70%.

4. The optical fiber coupler of claim 1, wherein the etendue ratio is above 1.5.

5. The optical fiber coupler of claim 4, wherein the etendue ratio is above 2.

6. The optical fiber coupler of claim 5, wherein the etendue ratio is above 10.

7. The optical fiber coupler of claim 1, wherein the cross-talk portions are optically coupled to one another along only a portion of their lengths.

8. The optical fiber coupler of claim 7, wherein the first cross-talk portion has a first down-stream portion, a first constant diameter portion and a first up-stream portion; the second cross-talk portion having a second down-stream portion, a second constant diameter portion and a second up-stream portion; and wherein the coupling region optically joins either the first down-stream portion or the first up-stream portion and a certain section of the first constant diameter portion of the first cross-talk portion to a corresponding one of the second up-stream portion or the second down-stream portion and a corresponding portion of the second cross-talk portion.

9. The optical fiber coupler of claim 1, wherein a first numerical aperture of the at least one inner multi-mode cladding of the first optical fiber is different from a second numerical aperture of the second optical fiber.

10. The optical fiber coupler of claim 1, wherein at least a portion of the first cross-talk portion of the first optical fiber is pre-tapered prior to coupling to the second optical fiber.

11. The optical fiber coupler of claim 1, wherein the first outer cladding is removed at least along the first cross-talk portion prior to the coupling to the second optical fiber.

12. The optical fiber coupler of claim 1, wherein the second optical fiber is one of a multi-mode optical fiber, a single-mode optical fiber, a double-clad optical fiber, a multiple-clad optical fiber and a coreless optical fiber.

13. Use of the optical fiber coupler of claim 1 in one of an optical coherent tomography system and a multimodal detection system.

14. The optical fiber coupler of claim 1, wherein the etendue ratio is above one and the multi-mode signal in the at least one inner multi-mode cladding of the first optical fiber is transmitted to the second optical fiber.

15. An optical fiber coupler comprising:
    a first fiber having a first end, a second end, a first middle portion therebetween and a first cross-section, and having a first core supporting a single guiding mode and a first inner cladding larger than the first core for guiding multiple modes;
    a second fiber having a third end, a fourth end, and a second middle portion therebetween, and having a second cross-section different from the first cross-section in at least one of structure and dimension, whereby a dimension of the second cross-section is different than a dimension of the first cross-section; and
    a fused region composed of the first middle portion fused to the second middle portion for a single mode signal to remain in the first core of the first fiber from the first end to the second end, and for more than half (50%) of a multi-mode signal in the first inner cladding of the first fiber to be extracted to the second fiber;
    wherein the first fiber is a pre-tapered double-clad fiber and a fundamental mode of the first core is adiabatically transformed into a fundamental mode of a reduced first inner cladding by pre-tapering of the first fiber, and the reduced first inner cladding is transformed into a single-mode guiding region.

16. The optical fiber coupler of claim 15, whereby a dimension of the second cross-section is greater than a dimension of the first cross-section.

17. The optical fiber coupler of claim 16, wherein more than 60% is extracted from the first fiber to the second fiber.

18. The optical fiber coupler of claim 17, wherein more than 70% is extracted from the first fiber to the second fiber.

19. The optical fiber coupler of claim 15, wherein the fused region is limited to either a down-tapered or an up-tapered portion of the first and the second fibers.

20. The optical fiber coupler of claim 15, wherein the outer cladding of the first middle portion of the first fiber is removed prior to the process of fusing the first fiber and the second fiber together.

21. A method for making an optical coupler comprising:
providing a first optical fiber having a first end, a second end, a first cross-talk portion therebetween, and having a first core, at least one inner cladding, and a first outer cladding, the first cross-talk portion having a first etendue;
providing a second optical fiber having a third end, a fourth end, a second cross-talk portion therebetween, the second cross-talk portion having a second etendue, the second etendue differing from the first etendue;
tapering at least the first cross-talk portion;
positioning at least a certain section of the first cross-talk portion of the first optical fiber in contact and along a certain section of the second cross-talk portion of the second optical fiber; and
providing heat to both certain sections of the first and second cross-talk portions in a manner forming a fused region;
wherein the fused region allows a single-mode signal to remain in the first core between the first end and the second end of the first optical fiber, and for more than half of a multi-mode signal in one of the at least one inner cladding of the first optical fiber to be extracted to the second optical fiber.

22. The method of claim 21, wherein said providing a second optical fiber further comprises tapering at least the second cross-talk portion prior to the steps of positioning and providing.

23. The method of claim 21, wherein said providing a first optical fiber further comprises chemically etching the first outer cladding at least along a certain portion of the first cross-talk portion prior to the steps of positioning and providing.

24. The method of claim 21, wherein said providing a second optical fiber further comprises chemically etching an outer cladding of the second optical fiber at least along a certain portion of the second cross-talk portion prior to the steps of positioning and providing.

* * * * *